Figure 1:
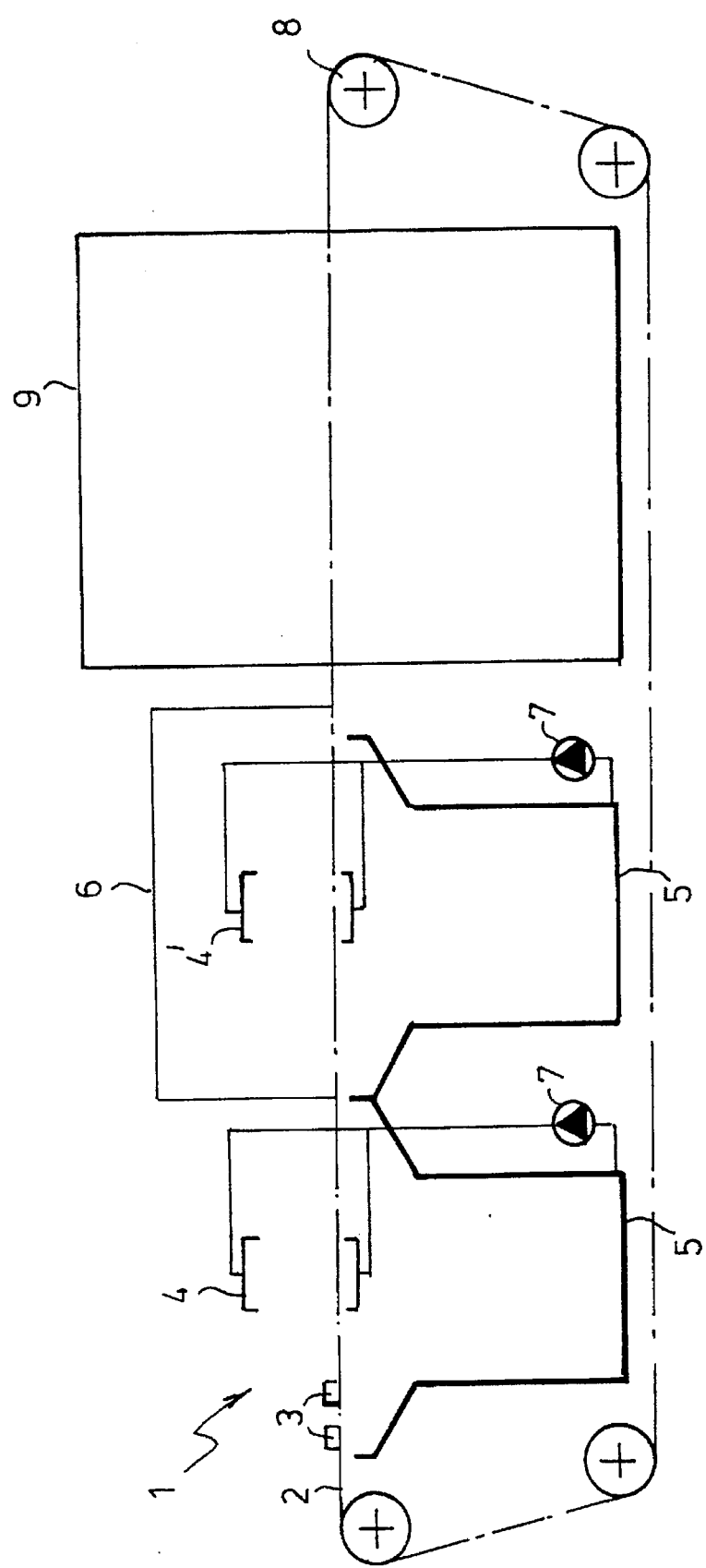

United States Patent

Lazarz et al.

[11] Patent Number: 5,659,973
[45] Date of Patent: Aug. 26, 1997

[54] DEVICE AND METHOD FOR REMOVING LIQUID ON A GAUZE CONVEYOR

[75] Inventors: Donald Lazarz, Elk Grove Village, Ill.; Jurjen Jan De Jong, Buitenpost, Netherlands

[73] Assignees: American National Can Co., Chicago, Ill.; VMI-EPE-Holland B.V., EPE, Netherlands

[21] Appl. No.: 481,295
[22] PCT Filed: Sep. 8, 1993
[86] PCT No.: PCT/NL93/00184
  § 371 Date: Jun. 27, 1995
  § 102(e) Date: Jun. 27, 1995
[87] PCT Pub. No.: WO94/15694
  PCT Pub. Date: Jul. 21, 1994

[30] Foreign Application Priority Data

Dec. 30, 1992 [NL] Netherlands ............ 9202288

[51] Int. Cl.⁶ .................................................. F26B 7/00
[52] U.S. Cl. ........................... 34/306; 34/115; 162/290; 162/296
[58] Field of Search ............... 34/306, 335, 336, 34/355, 381, 403, 406, 438, 440, 452, 453, 455, 456, 458, 502, 115, 123, 124, 616, 617, 635, 650; 162/290, 297

[56] References Cited

U.S. PATENT DOCUMENTS

| 2,871,770 | 2/1959 | Jackson | 162/290 X |
| 3,394,041 | 7/1968 | DeLigt | 34/115 |
| 3,429,054 | 2/1969 | Walker et al. | 34/306 X |
| 3,738,785 | 6/1973 | Reinhardt et al. | 162/297 X |
| 3,806,406 | 4/1974 | Ely | 162/290 X |
| 4,121,968 | 10/1978 | Wells | 162/290 |
| 5,022,163 | 6/1991 | Ilvespaa et al. | 34/115 X |
| 5,465,502 | 11/1995 | Holik et al. | 34/115 |

FOREIGN PATENT DOCUMENTS

| 2649017 | of 0000 | France. |
| 432399 | of 0000 | Switzerland. |
| 9013347 | of 0000 | WIPO. |

*Primary Examiner*—John M. Sollecito
*Assistant Examiner*—Steve Gravini
*Attorney, Agent, or Firm*—Ladas & Parry

[57] ABSTRACT

A device for removing liquid on a gauze conveyor for conveying products, the gauze conveyor having an upper side for carrying products and being provided with link portions and having a gauze pattern. The device having means for removing liquid on the upper side of the gauze conveyor by extraction said means being placed directly under the gauze conveyor and being formed by a hollow, rotatable roll which is provided with rows of separate projecting teeth, said rows extending axially on the roll, the teeth fitting into the gauze pattern and the link portions being enclosable by the teeth. The roll has holes between the teeth which holes extend into the cavity of the roll.

6 Claims, 3 Drawing Sheets

DEVICE AND METHOD FOR REMOVING LIQUID ON A GAUZE CONVEYOR

The invention relates to a device for removing liquid on a gauze conveyor, the gauze conveyor having an upper side for carrying products, and being provided with link portions and having a gauze pattern, the device having means for removing liquid by extraction placed directly under the gauze conveyor.

The invention also relates to a method for removing liquid on a gauze conveyor, in which method such a device is used.

Such a device and method for removing liquid on a gauze conveyor are known from WO-A-9013347.

A method and a device for removing liquid on a gauze conveyor are generally used in industrial washing devices in which products are conveyed through a washing and drying installation by means of one or more gauze conveyors. Generally washing occurs in two or more stations of the washing installation where the products which are situated on the gauze conveyor are washed, for example, with the help of sprinklers. Under the sprinklers and the gauze conveyor tanks for collecting the liquid which goes through the gauze conveyor are located. The liquid collected in the tanks is generally reused for washing. It is, however, desirable that no transfer of liquid takes place between the stations. If for example, per station another liquid is used, an undesirable mixing of the liquids in the tanks could occur as a result of liquid transfer. From an economical point of view it is moreover advisable that as little liquid as possible is conveyed from the washing to the drying installation.

In practice it has, however, appeared that due to the gauze conveyor the liquid is conveyed further and is unwantedly transferred to other processing stations.

In order to reduce this unwanted transfer, methods and devices other than the ones described in WO-A-9013347 are known for removing liquid on a gauze conveyor.

For example, it is known to remove liquid on products which are located on a gauze conveyor with the help of a device for generating high air pressure, which device is located above the gauze conveyor. Although liquid can thus be removed from the product in an efficient way, the distance between the high air pressure device and the conveyor is too large to also remove liquid efficiently from the conveyor.

Wiping off the lower side of the conveyor with the help of a brush is also known. This treatment is limited to the lower side of the conveyor, however.

It is, amongst others, an object of the present invention, to provide an alternative method and device for removing liquid on a gauze conveyor, whereby the unwanted transfer of liquid through the gauze conveyor is prevented in a more efficient way.

For this purpose according to one aspect of the invention a device for removing liquid on a gauze conveyor as defined in the opening paragraph is characterized in that the means are formed by a hollow, rotatable roll which is provided with projecting teeth, the teeth fitting into the gauze pattern and the link portions being enclosable by the teeth, and with holes between the teeth which extend into the cavity of the roll, and in that the cavity of the roll is connected to an extractor means. As the link portions are enclosed by the teeth, the extraction is conducted close to the link portions, the latter providing an effective removal of the liquid. As the holes in the roll move with the conveyor the period of operation of the extraction on the conveyor is sufficient to remove the liquid and no separate driving is needed for the roll.

A further preferred embodiment of a device according to the invention is characterized in that a pipe is arranged in the cavity of the roll, the roll being rotatable around the pipe, and in that the pipe is provided on its side directed towards the conveyor with openings placed in a pattern. If the holes in the serrated roll correspond to the openings in the pipe, a strong, efficient extraction of the liquid occurs.

Preferably the openings are countersunk so that extraction on the upper side of the roll is guaranteed at any position. Thus lateral movement of the gauze conveyor and the roll with regard to the pipe has no disadvantageous effect on the working of the extraction.

According to another aspect of the invention a method for removing liquid on a gauze conveyor is provided, in which method a device according to the invention is used, characterized in that the extraction is effectuated via the cavity and the holes of the roll and the roll being rotatable. Such an extraction appears to be advantageous, in that the effective period of operation of the extraction on the part of the conveyor above the roll, among other things due to the rotation of the roll, is sufficient to remove the liquid. As the link portions are enclosed by the teeth, the extraction is effectively conducted along the link portions.

Figure 2:
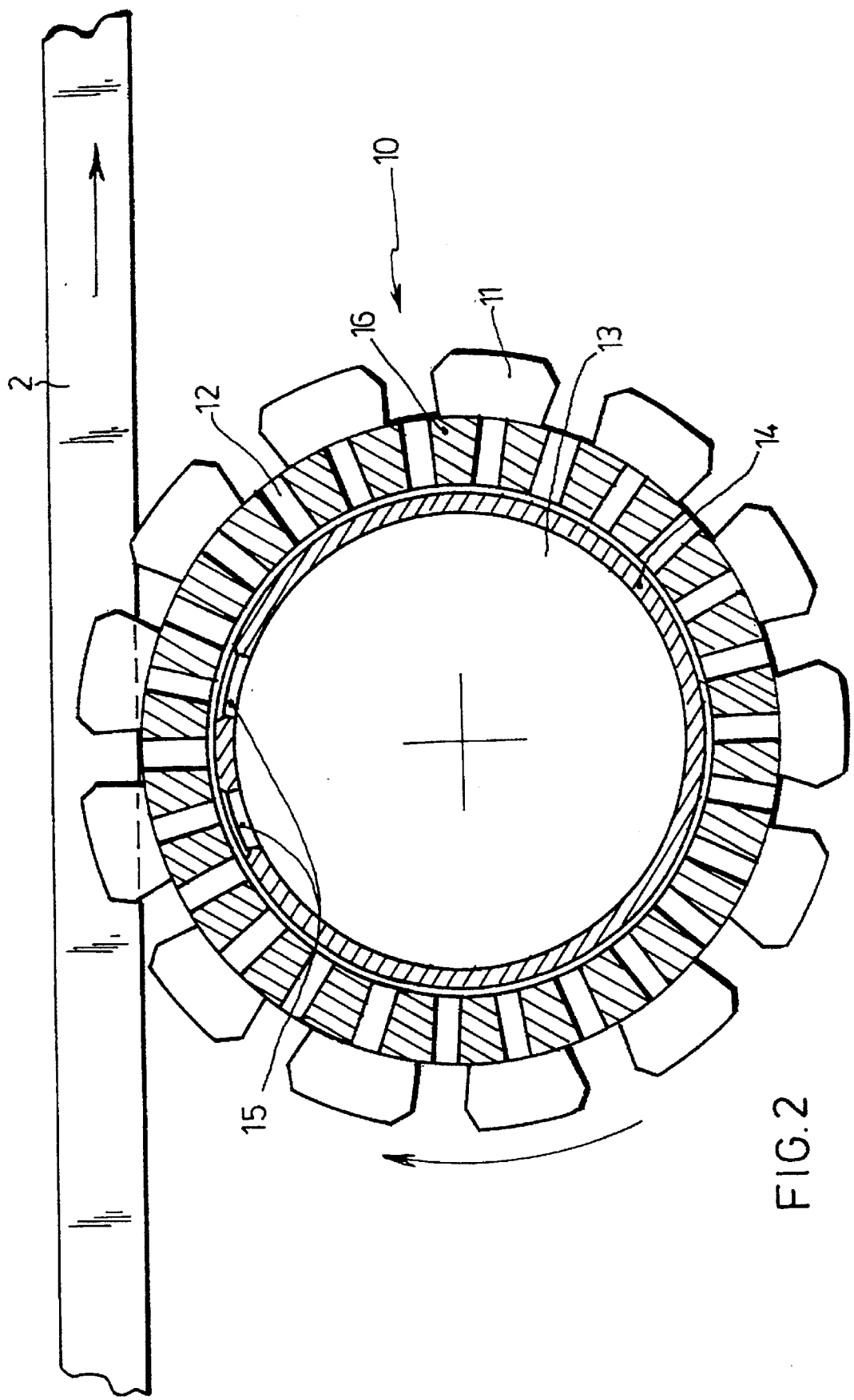
Figure 3:
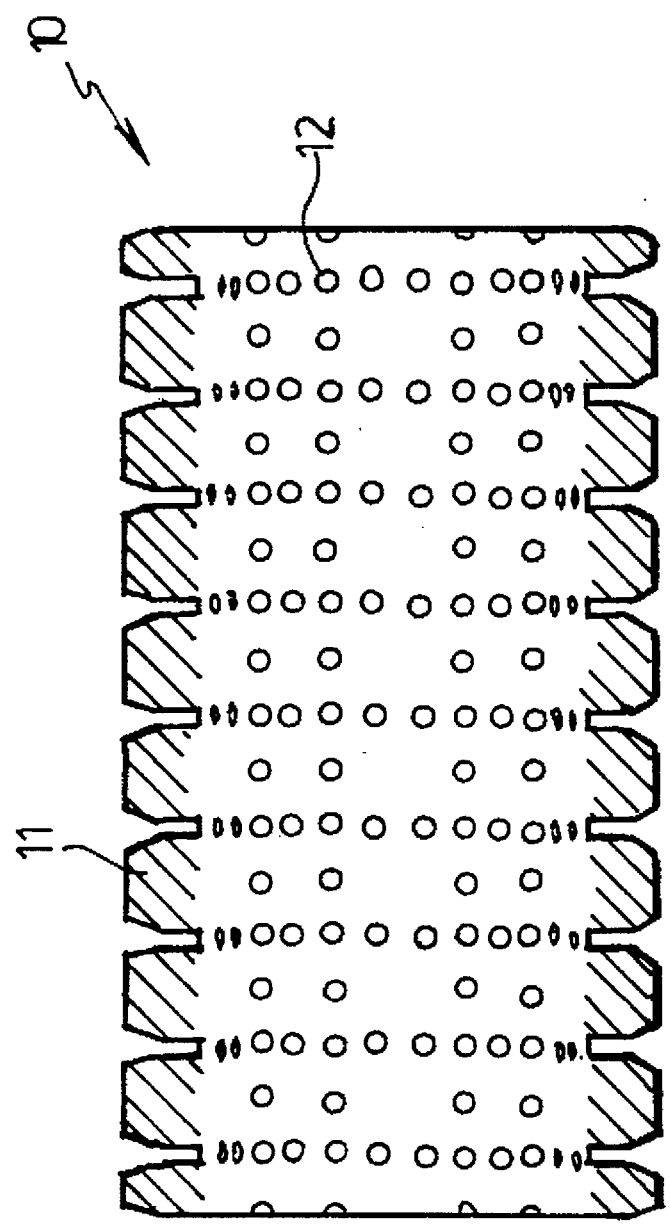

By way of example some embodiments of the invention will be described with reference to the drawing in which:

FIG. 1 schematically shows an industrial washing device;

FIG. 2 schematically shows a hollow, serrated roll with pipe for removing liquid on a gauze conveyor in cross section, and FIG. 3 schematically shows the roll in FIG. 2 without pipe in longitudinal cross section.

In FIG. 1 an industrial washing device 1 is shown schematically in which products 3 are conveyed by means of a gauze conveyor 2 through a washing installation in this example with two washing stations 4, 4', and a drying installation 9. The washing stations 4, 4' can, for example, contain sprinklers which are activated by pumps 7. The gauze conveyor 2 is driven by means of one or more pulleys 8. Washing liquid, for example water, that is sprinkled by sprinklers 4, 4' on to the products and the gauze conveyor 2, is collected in tanks 5 and reused. To prevent transport of liquid from washing station 4 to washing station 4', and from washing station 4' to drying installation 9, devices have been arranged on transfer points 6 for removing liquid on the conveyor 2. These devices include means which provide an extraction of the liquid directly under the conveyor 2. The extraction can easily be adjusted such that liquid can be removed not only on the under side of the conveyor but also on the upper side thereof and even on the lower part of the products.

In the following the invention will be described with reference to a gauze conveyor with link portions and a gauze pattern, although the invention can be used equally well on other gauze conveyors, for example without link portions.

The means 10 for the extraction of liquid are preferably formed by a hollow, rotatable roll 16 as represented in cross section in FIG. 2. The roll 16 is provided with projecting teeth 11 which fit into the gauze pattern of the conveyor 2 and which enclose the link portions of the conveyor 2. Due to the fact that the teeth 11 fit into the gauze pattern, the roll 16 is rotated by the conveyor 2 and a separate drive for the roll 16 is not necessary. Between the teeth 11 holes 12 are arranged which extend into the cavity 13 of the roll 16. The roll extends preferably over the whole breadth of the conveyor. A stationary pipe 14 is arranged in the cavity 13 of the roll 16 and is provided on its side facing the conveyor 2 with openings 15 placed in a pattern. The cavity 13 of the roll 16 communicates with an extractor means, for example a ventilator. If the holes 12 of the roll 16 correspond with the openings 15 of the pipe 14 during rotation, then transport of air with a relatively high speed occurs. Because the link portions are enclosed by the teeth 11, the air is conducted closely along the link portions. In this way an efficient removal of liquid takes place on the conveyor. The number of holes 12 and the hole pattern can differ in a variety of ways. An example of such a hole pattern which is adjusted to the conveyor used is schematically represented in longitudinal cross section in FIG. 3.

The openings 15 in the pipe 14 are preferably countersunk so that the lateral movement of the gauze conveyor and thus of the roll with regard to the pipe have no disadvantageous effect on the extraction. Also on account of the fact that the holes 12 of the roll 16 move with the conveyor, an extraction working period results which is adequate for removing liquid on the conveyor in a sufficiently large quantity. The extracted liquid can be transported to a tank (5, FIG. 1) and otherwise used.

By way of example the invention has been described by referring to a washing installation with water, but it will be clear that with this invention liquids other than water, for example oil, can be removed from the conveyor. Apart from that it is also possible to use the hollow, serrated roll as pulley for the conveyor.

We claim:

1. A device for removing liquid comprising a gauze conveyor for conveying products, the gauze conveyor having an upper side for carrying products and being provided with link portions and having a gauze pattern, the device having means for removing liquid on the upper side of the gauze conveyor by extraction, said means being placed directly under the gauze conveyor, and being formed by a hollow, rotatable roll having a cavity, the roll having rows of separate projecting teeth, said rows extending axially on the roll, the teeth fitting into the gauze pattern and the link portions being enclosable by the teeth, the roll comprising holes between the teeth, which holes extend into the cavity of the roll, the device for removing liquid comprising an extractor means connected to the cavity of the roll for removing liquid from the gauze conveyor.

2. The device according to claim 1, wherein a pipe is arranged in the cavity of the roll, the roll being rotatable around the pipe, and the pipe is provided on its side directed towards the conveyor with openings placed in a pattern.

3. The device according to claim 2, wherein the openings of the pipe are countersunk.

4. A method for removing liquid on a gauze conveyor, in which method the device according to claim 1 is used, wherein the extraction is effectuated via the cavity and the holes of the roll.

5. A method for removing liquid on a gauze conveyor, in which method the device according to claim 2, is used, wherein the extraction is effectuated via the cavity and the holes of the roll.

6. A method for removing liquid on a gauze conveyor in which method the device according to claim 3, is used, wherein the extraction is effectuated via the cavity and the holes of the roll.

* * * * *